(12) United States Patent
Cionca et al.

(10) Patent No.: US 10,706,295 B2
(45) Date of Patent: Jul. 7, 2020

(54) STREET LIGHT WITH INFRARED ILLUMINATION

(71) Applicant: Ford Global Technologies, LLC, Dearborn, MI (US)

(72) Inventors: Codrin Cionca, Ann Arbor, MI (US); Helen Elizabeth Kourous-Harrigan, Monroe, MI (US); Jeffrey Thomas Remillard, Ypsilanti, MI (US); Ankit Girish Vora, Dearborn, MI (US); Lu Xu, Dearborn, MI (US); Linjun Zhang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 65 days.

(21) Appl. No.: 16/023,016

(22) Filed: Jun. 29, 2018

(65) Prior Publication Data
US 2020/0005054 A1 Jan. 2, 2020

(51) Int. Cl.
*G06K 9/00* (2006.01)
*B60R 1/00* (2006.01)
*B60W 30/09* (2012.01)

(52) U.S. Cl.
CPC ............ *G06K 9/00805* (2013.01); *B60R 1/00* (2013.01); *B60W 30/09* (2013.01); *B60R 2300/103* (2013.01); *B60W 2420/403* (2013.01); *B60W 2554/00* (2020.02)

(58) Field of Classification Search
CPC .................. G06K 9/00805; B60R 1/00; B60R 2300/103; B60W 30/09; B60W 2550/10; B60W 2420/403
See application file for complete search history.

(56) References Cited

U.S. PATENT DOCUMENTS

| 5,623,186 A * | 4/1997 | Archdekin ......... H05B 37/0218 315/149 |
| 6,535,242 B1 * | 3/2003 | Strumolo ................ B60R 11/04 348/148 |
| 7,345,414 B1 | 3/2008 | Miller et al. |
| 7,806,571 B2 | 10/2010 | Wang et al. |
| 2003/0189499 A1 * | 10/2003 | Stricklin .............. G08G 1/0175 340/933 |
| 2005/0052742 A1 * | 3/2005 | Brinkmann ............. F21V 5/002 359/558 |
| 2008/0037268 A1 | 2/2008 | Tendo et al. |

(Continued)

FOREIGN PATENT DOCUMENTS

| CN | 102745139 A | 10/2012 |
| CN | 103538519 B | 8/2016 |
| DE | 4032927 C2 | 4/1993 |

OTHER PUBLICATIONS

"Projects and Clients", Axton, copyright 2018, https://axtontech.com.

(Continued)

*Primary Examiner* — Lewis G West
(74) *Attorney, Agent, or Firm* — Frank A. MacKenzie; Bejin Bieneman PLC

(57) ABSTRACT

A system includes a light source configured to emit light in a wavelength in a visible range and a wavelength in an infrared range, and a vehicle including an infrared camera, and a computer programmed to identify an object based at least in part on an infrared image from the camera.

19 Claims, 6 Drawing Sheets

(56) References Cited

U.S. PATENT DOCUMENTS

| | | | |
|---|---|---|---|
| 2009/0034228 A1* | 2/2009 | Tsai | G08G 1/04 |
| | | | 362/20 |
| 2011/0001626 A1* | 1/2011 | Yip | H05B 37/0263 |
| | | | 340/635 |
| 2012/0257059 A1* | 10/2012 | Schofield | B60N 2/002 |
| | | | 348/148 |
| 2014/0320025 A1* | 10/2014 | Assoulin | H05B 37/0227 |
| | | | 315/154 |
| 2016/0174039 A1* | 6/2016 | Huang | H04W 4/023 |
| | | | 455/456.3 |
| 2019/0118801 A1* | 4/2019 | Noh | B60W 30/06 |
| 2019/0256087 A1* | 8/2019 | Kim | B60W 10/18 |

OTHER PUBLICATIONS

Remillard et al. "Automotive Night Vision Enhanced by Near-Infrared Technology", Photonics Media, Oct. 2005, https://www.photonics.com/a23154/Automotive_Night_Vision_Enhanced_by_Near-Infrared.

\* cited by examiner

STREET LIGHT WITH INFRARED ILLUMINATION

BACKGROUND

A vehicle may include one or more object detection sensors such as a camera sensor, etc., to detect objects, e.g., in an area outside the vehicle. A vehicle computer may operate the vehicle, e.g., by actuating a propulsion, braking, steering, based on the detected object(s). In low light conditions, e.g., at night, a vehicle computer may fail to detect an object in the area outside the vehicle. Thus, the computer may lack sufficient or adequate data to actuate vehicle components.

DETAILED DESCRIPTION

Introduction

Figure 1:
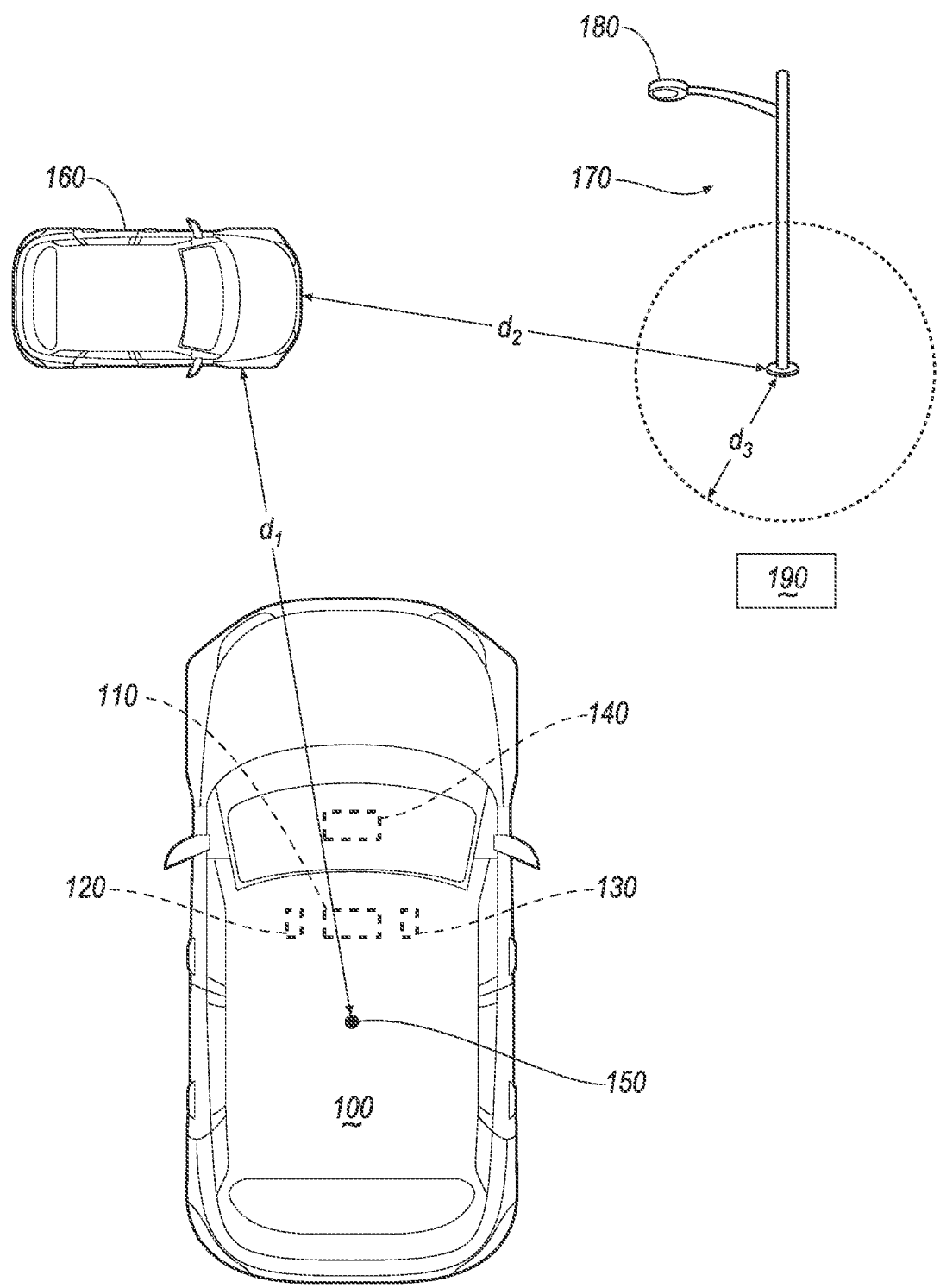
FIG. 1 is a diagram illustrating an example vehicle, an object, and a street light.

Disclosed herein is a system including a light source configured to emit light in a wavelength in a visible range and a wavelength in an infrared range, and a vehicle including an infrared camera, and a computer programmed to identify an object based at least in part on an infrared image from the camera.

The camera of the vehicle may further include an optical path configured to allow the infrared wavelength to pass.

The computer may be further programmed to actuate at least one of a vehicle propulsion, a vehicle steering, and a vehicle brake actuator, based on the identified object.

The computer may be further programmed to receive image data from captured light at each of the visible and infrared wavelengths, determine a quality value of the received image data; and upon determining that the determined quality value exceeds a specified threshold, identify the object.

The system may further include a second computer, programmed to actuate the light source of a street light to emit light at the infrared wavelength upon determining that the object is within a specified distance from the street light.

The second computer may be further programmed to determine that the object is within the specified distance from the street light based on stored location data of the street light and received object location data.

The computer may be further programmed to receive image data from captured light at each of the visible and infrared wavelengths, determine a classification confidence value of the received image data, and upon determining that the determined classification confidence value exceeds a specified threshold, identify the object.

The system may further include a second computer programmed to actuate the light source of the street light, upon determining that an ambient light intensity is below a specified threshold.

The second computer may be further programmed to activate the light source to emit light with the visible wavelength, upon determining that an ambient light intensity is below a specified threshold.

The light source may be included in a street light.

Further disclosed herein is a method including emitting, from a light source, light in a wavelength in a visible range and a wavelength in an infrared range, and identifying, in a vehicle, an object based at least in part on an infrared image from a vehicle infrared camera.

The camera of the vehicle may further include an optical path configured to allow the infrared wavelength to pass.

The method may further include actuating at least one of a vehicle propulsion, a vehicle steering, and a vehicle brake actuator, based on the identified object.

The method may further include receiving image data from captured light at each of the visible and infrared wavelengths, determining a quality value of the received image data, and upon determining that the determined quality value exceeds a specified threshold, identifying the object.

The method may further include actuating the light source of a street light to emit light at the infrared wavelength upon determining that the object is within a specified distance from the street light.

The method may further include determining that the object is within the specified distance from the street light based on stored location data of the street light and received object location data.

The method may further include receiving image data from captured light at each of the visible and infrared wavelengths, determining a classification confidence value of the received image data, and upon determining that the determined classification confidence value exceeds a specified threshold, identifying the object.

The method may further include actuating the light source of a street light, upon determining that an ambient light intensity is below a specified threshold.

The method may further include activating the light source to emit light with the visible wavelength, upon determining that an ambient light intensity is below a specified threshold.

The light source may be included in a street light.

Further disclosed is a computing device programmed to execute any of the above method steps. Yet further disclosed is an aerial drone comprising the computing device. Yet further disclosed is a vehicle comprising the computing device.

Yet further disclosed is a computer program product comprising a computer readable medium storing instructions executable by a computer processor, to execute the any of the above method steps.

Exemplary System Elements

A vehicle includes sensors such as an infrared camera(s), e.g., a near-infrared camera, providing data for object detection. An infrastructure light source, e.g., a street light, includes a light source or sources that can emit light at a first wavelength in a wavelength range of human-visible light, and a second wavelength in an infrared range. The vehicle computer is programmed to identify an object, e.g., another vehicle, based at least in part on an infrared image from the camera. The illumination of the object with the infrared light can improve detection of the object by the computer, advantageously even if the vehicle is not equipped with, or has not activated, an infrared light source.

FIG. 1 illustrates a vehicle 100, an object 160, e.g., another vehicle, and a street light 170. The vehicle 100 may be powered in a variety of ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI 140).

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode, an operator controls the vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, a HMI 140, etc. Alternatively or additionally, in cases where the computer 110 actually comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. For example, the sensors 130 may include one or more camera, radar, infrared, and/or LIDAR sensors 130 disposed in the vehicle 100 and/or on the vehicle 100 providing data encompassing at least some of the vehicle 100 exterior. The data may be received by the computer 110 through a suitable interface such as in known. A LIDAR sensor 130 disposed, e.g., on a top of the vehicle 100, may provide object data including relative locations, sizes, and shapes of objects such as other vehicles surrounding the vehicle 100. A vehicle 100 computer 110 may receive the object data and operate the vehicle in an autonomous and/or semi-autonomous mode based at least in part on the received object data.

The HMI 140 may be configured to receive user input, e.g., during operation of the vehicle 100. For example, a user may select a mode of operation, e.g., an autonomous mode, by inputting a requested mode of operation via an HMI 140. Moreover, an HMI 140 may be configured to present information to the user. Thus, an HMI 140 may be located in a passenger compartment of the vehicle 100. In an example, the computer 110 may output information indicating that a vehicle 100 mode of operation such as an autonomous mode is deactivated due to an event, e.g., a LIDAR sensor 130 sensor being covered or blocked, e.g., by fog, moisture, dirt, etc., in a manner that impairs object detection.

Figure 2:
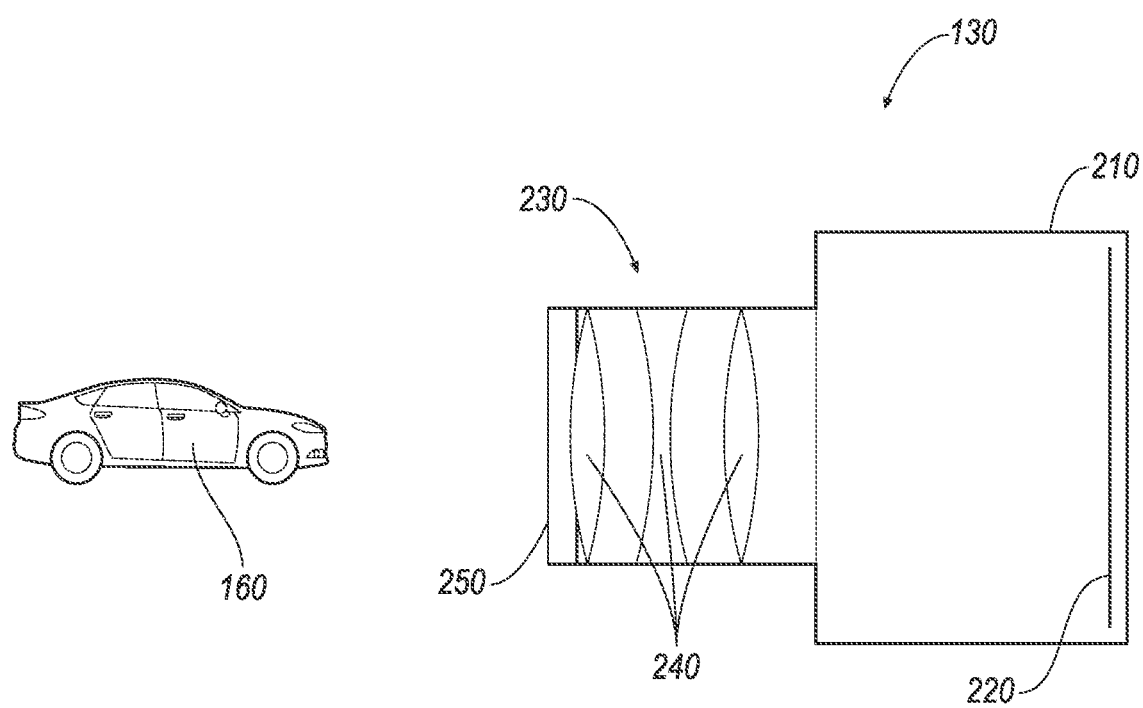
FIG. 2 is a diagram showing an example camera sensor of the vehicle of FIG. 1.

FIG. 2 shows an example camera sensor 130 including a body 210, an image sensor 220, and an optical path 230. The camera sensor 130 may receive light beams from an area within a field of view of the sensor 130, and may generate an electrical signal based on the received light beams, e.g., in a conventional manner. The body 210 may include a housing, e.g., formed of plastic, metal, etc., that encloses components of the camera sensor 130. The image sensor 220 may include an electronic receiver, e.g., a charge-coupled device (CCD), that receives reflections of the light beams, e.g., the light beams transmitted by the street light 170, and generates electric signals based on the received light beams. The image sensor 220 may detect light beams in a wavelength range specific to the image sensor 220. For example, the image sensor 220 may have a detection range including a human visible wavelength range, an infrared wavelength range, etc. The optical path 230 may include one or more lenses 240 that focus incoming light beams onto the image sensor 220.

The computer 110 may be programmed to generate an image based on the generated electric signal from the image sensor 220. An image, in the present context, is a digital image that is storable in a computer 110 memory. A digital image may include a plurality of pixels and the image data may include data such as image intensity and/or color associated with each one of the pixels. The lenses 240 may be formed of plastic and/or glass. Further, the optical path 230 may include one or more filters 250. A light filter 250 may filter an incoming light beam based on a wavelength of the incoming light beam. For example, the filter 250 may be configured (or manufactured) to filter out a specified wavelength range. An incoming light beam may include multiple wavelength(s), or one or more ranges of wavelengths. The filter 250 may be configured to pass a first range of the light through and to weaken or block altogether a second wavelength range. In the present context, an ability of a filter to pass, block, or weaken a light beam is a characteristic of the filter 250.

The computer 110 may be programmed to detect an object 160 based on data received from the sensors 130, e.g., the camera sensor 130. The computer 110 may be programmed to operate the vehicle 100 based on the detected object(s) 160. The computer 110 may be programmed to determine a distance $d_1$ between the vehicle 100 and the detected object 160, and to operate the vehicle 100 based on the determined distance $d_1$. In one example, the computer 110 may be programmed to actuate a vehicle 100 brake actuator 120 upon determining that the distance $d_1$ is less than a specified distance threshold, e.g., 10 meters.

As described above, the operation of the vehicle 100 may at least in part be based on the received image data from the camera sensor(s) 130. A detection of an object 160 may be based on optical properties of the received image data. Optical properties may include one or more of a brightness, contrast, histogram, etc. Thus, the computer 110 may fail to detect an object 160 and/or detect a non-existing object by mistake based on the optical properties of the image data such as a low brightness of an image in a low light condition, e.g., during night time.

The optical properties, e.g., the brightness, of the received image data may be based on (i) an illumination of the field of view of the camera sensor 130, (ii) how the lens(es) 240 focus the light beam(s) on the image sensor 220, and/or (iii) the characteristic of the filter(s) 250. For example, the brightness of the received image may be based on an intensity and/or a wavelength of illumination provided by light sources, e.g., the street light(s) 170, vehicle 100 lights, etc. In another example, the brightness of the received image may be based on a wavelength (or a wavelength range) of the received light beams that pass through the filter 250 and/or are detected by the image sensor 220. In other words, the received electrical signal from the image sensor 220 may lack signals related to a specified wavelength of the light beams, if the filter 250 weakens, or does not allow light of the specified wavelength to pass, i.e., blocks, the specified wavelength, or the image sensor 220 is unable to (or is configured not to) detect the specified wavelength.

In one example, the street light(s) 170 can include a light source 180 with a first wave length in a human visible wavelength range and a second wavelength in an infrared wavelength range, and the vehicle 100 can include an infrared camera sensor 130. Further, the vehicle 100 computer 110 can be programmed to identify an object 160 based at least in part on an infrared image 320 from the camera 130. A human visible wavelength range may be a wavelength range of 390 to 770 nanometer (nm). An infrared wavelength range may be a wavelength range of 770-1000 nm that is substantially invisible to human eyes.

The light source 180 may include a first light source, e.g., one or more light emitting diodes (LEDs) that can provide light at the first wavelength and a second light source, e.g., one or more LEDs that can provide light at the second wavelength. In another example, the light source 180 may include one or more light sources, e.g., LEDs, that can emit both the first and second wavelengths. In other words, a LED may emit light with a wavelength range that at least partially overlaps both the human visible and the infrared wavelength ranges. For example, the light source 180 may include one or more LEDs that emit light beams in a wavelength ranges between 500 and 950 nm.

The optical path 230 may include a filter 250 that allows the infrared light beams (i.e., reflections of light having the second wavelength) to pass, or a filter may be omitted from the optical path 230. Thus, the received image data may include infrared image data associated with reflection(s) of the infrared light beams received from the object 160. Therefore, the computer 110 may be programmed to identify the object 160 at least partially based on the received infrared image data. In another example, the vehicle 100 may include a first camera 130 with a filter 250 that does not allow the infrared light to pass, and a second camera, i.e., an infrared camera, that substantially allows only light beams in the infrared wavelength range to pass. Thus, the computer 10 may be programmed to receive human visible image data from the first camera and infrared image data from the second camera, and to identify the object based on the human visible and infrared image data. The computer 110 may be programmed to combine the human visible and infrared image data to generate an image and to identify the object 160 in the combined image data. In another example, the camera sensor 130 may be configured to capture light in a wavelength range including the visible and infrared light. Thus, the image data received from the camera sensor 130 may include image data from the visible light and infrared light.

As discussed above, light in an infrared wavelength range is typically invisible to human eyes. However, the computer 110 may be programmed to generate an image based on the received infrared image data using conventional image processing techniques. Additionally, the computer 110 may be programmed to generate an image based on infrared image data that is visible to human eyes, e.g., using techniques such as wavelength shifting, color correction, etc.

Figure 3A:
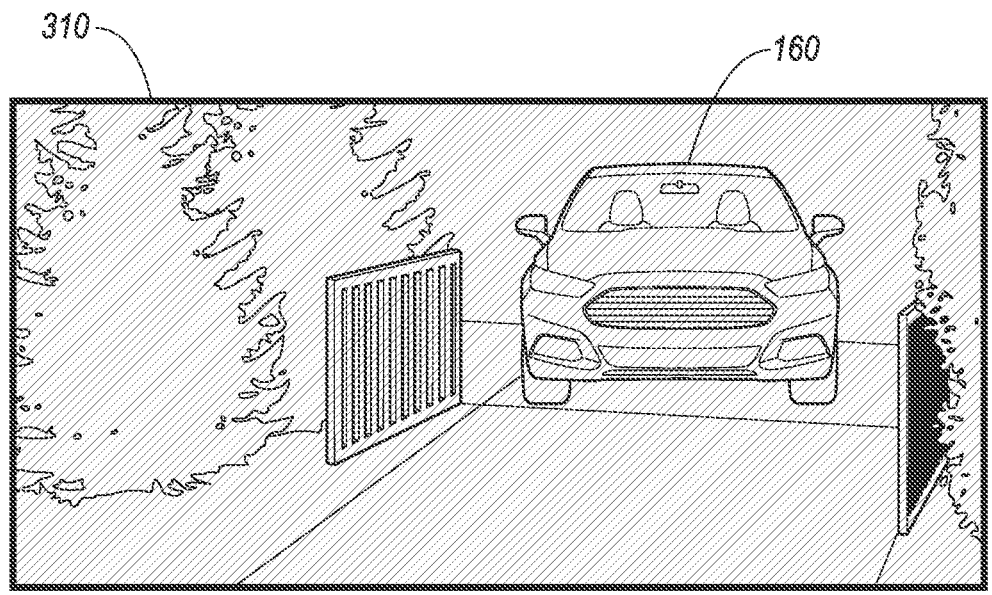
FIG. 3A is an example image received from the camera sensor using illumination with a human visible wavelength.
Figure 3B:
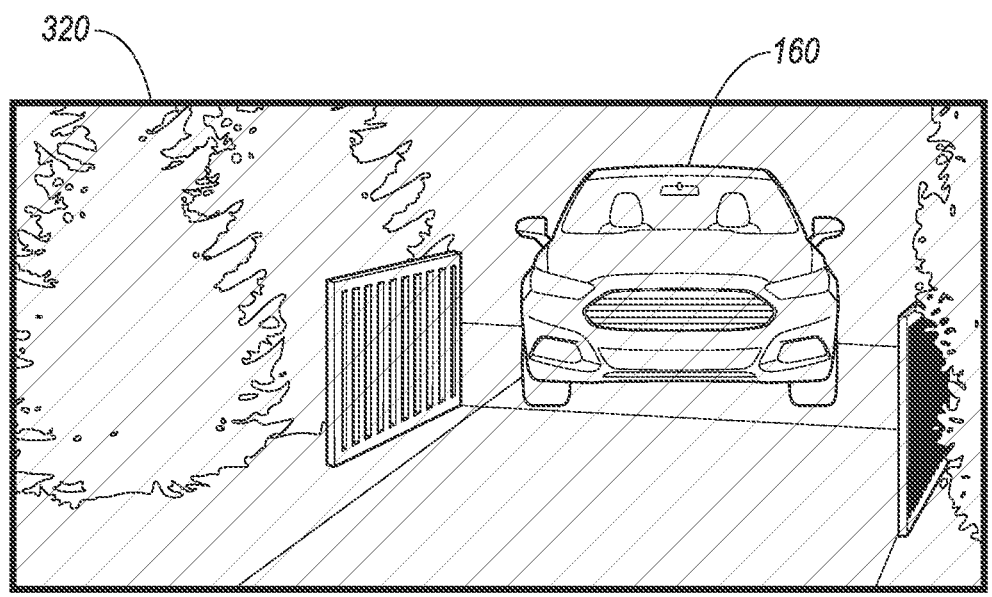
FIG. 3B is an example image received from the camera sensor using illumination with a human visible and an infrared wavelength.

With reference to FIGS. 3A and 3B, the computer 110 may be programmed to receive an example image 310 based on data received from the camera sensor 130 that is generated by the image sensor 220 based on an illumination of the object 160 by light in a human-visible wavelength range. The computer 110 may be further programmed to receive an example image 320 based on data received from the camera sensor 130 that is generated by the image sensor 220 based on an illumination of the object 160 using light beams with the first and second wavelength ranges, i.e., human visible and infrared wavelength ranges).

With reference to example image 310, 320, the computer 110 may be programmed to determine a classification confidence and/or a quality value of an image 310, 320, and to determine whether the classification confidence and/or the quality of the received image is sufficient for performing object detection, e.g., detecting an object 160. The computer 110 may be further programmed to operate the vehicle 100 in an autonomous and/or semi-autonomous mode, upon determining that the classification confidence and/or the quality of the received image 310, 320 exceeds a specified threshold (i.e., a confidence threshold or a quality threshold), but otherwise to prevent or not engage in semi-autonomous and/or autonomous operation.

In the present context, a classification confidence is a numeric value, e.g., specified in a range of 0% to 100%, that quantifies a suitability of the received image data for classifying any object, e.g., the object 160, included in the received image data. The computer 110 may be programmed to determine the classification confidence (or confidence) using known object detection techniques, e.g., including image processing, neural networks, etc. For example, image data received in low light conditions, e.g., at night time, using visible light wavelengths may lead to low sharpness and/or contrast (e.g., less than the confidence threshold) of image data. Thus, the computer 110, (e.g., programmed using neural network-based object detection techniques) may determine a lower classification confidence for images received during low light conditions compared to images received during normal light conditions, e.g., day time. In contrast to using visible light illumination only, image data received during low light conditions, e.g., at night time, using infrared and/or near-infrared wavelengths may have higher sharpness and/or contrast, which may enhance (i.e., increase) the classification confidence of the image. In other words, by illuminating an area using near-infrared and/or infrared light, the classification confidence of the image data may be increased, which may result in an improved ability of computer 110 to detect object(s) 160 in the field of view of the camera sensor 130.

A quality of an image herein means a numeric value, e.g., specified in a range of 0% to 100%, that quantifies a suitability of the received image data for performing object detection. The quality may be defined based on one or more properties of the image data such as brightness, contrast, saturation effect, sharpness, noise, distortion, vignetting (dark images near a corner of image), etc. The computer 110 may be programmed to determine the quality of the image 310, 320 using a mathematical technique based on a specified image quality definition. Additionally or alternatively, the computer 110 may be programmed to determine the image quality further in accordance with the light condition. For example, the computer 110 may be programmed to use different quality definitions (as discussed with reference to FIGS. 4A-4B) based on environmental conditions such as day time, night time, interior (e.g., inside a structure such as a tunnel, garage, etc.) and/or outside (e.g., on a road). Thus, the computer 110 may be programmed to determine the environmental conditions, e.g., based on data received from a vehicle 100 light sensor 130 and a time of the day, etc., to select an image quality definition (or formula) based on the determined environmental conditions, and to determine the image quality based on the selected image quality definition and the received image data.

Figure 4A:
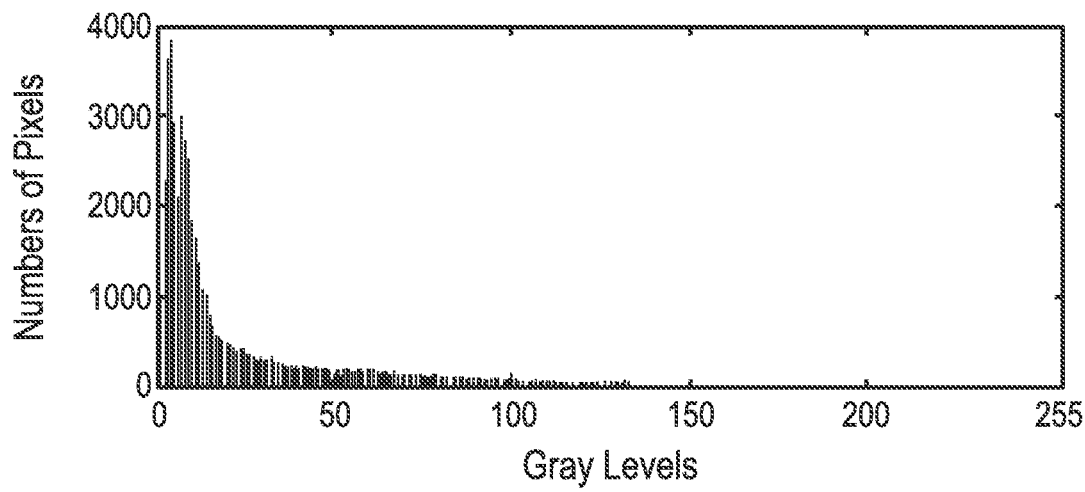
FIG. 4A is an example histogram of the image of FIG. 3A.
Figure 4B:
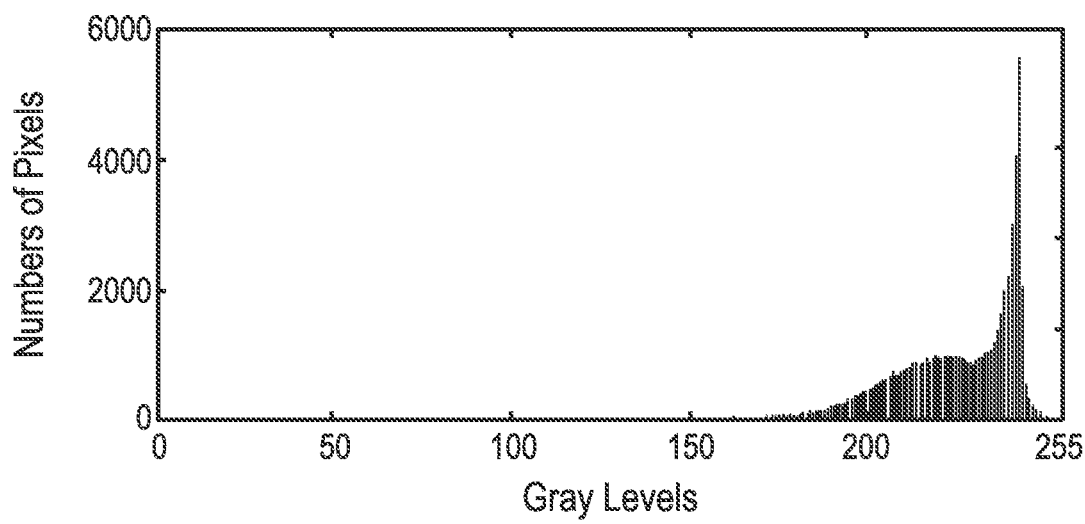
FIG. 4B is an example histogram of the image of FIG. 3B.

With reference to FIGS. 4A and 4B, the computer 110 may be programmed to determine the image 310, 320 quality by generating a histogram or the like, such as illustrated by example histogram graphs 410, 420 of received image data, and to determine the image 310, 320 quality based on the determined histogram graphs 410, 420. In an example, the graphs 410, 420 are the histogram graphs of the images 310, 320 respectively. Values on an X axis of graphs 410, 420 show an intensity value of 0 to 255, and values on Y axis specify a number of pixels in the image 310, 320 with the respective intensity. For example, a value of 1000 at an intensity value 20 means that the image has 1000 pixels with the intensity value 20.

As shown in the example graphs 410, 420, a distribution of a histogram graph of the image 310 compared to the image 320 is more concentrated on a left side of the graph (i.e., low intensity pixel values). In the present context, "concentrated" means the distribution of data has a low standard deviation, e.g., less than 30% of a range of data. For example, with reference to the FIG. 4B, the intensity value of graphs 420 is specified between 0 (zero) and 255. The data is concentrated around an intensity value 230 when the mean value is 230 and a standard deviation is less than 75, which is 30% of the range 0 to 255. In other words, an image 320 with a distribution of histogram graph 420 which is more concentrated on the right side, is brighter than an image 310 with a distribution of the histogram 410, which is more concentrated on the left side. The quality of the image 310, 320 may be specified based on a brightness of the image 310, 320, e.g., the quality may be specified as a mean value of the histogram graph 410, 420.

The computer 110 may be programmed to determine that the quality of the image 320 is sufficient for operation of the vehicle 100 in the autonomous or semi-autonomous mode upon determining that at least one of (i) the classification confidence of the received image data exceeds a confidence threshold, e.g., 50%, and (ii) the quality value (i.e., the mean value of the histogram graph 420) exceeds a specified quality threshold, e.g., 100. In other words, a quality of image data is determined to be sufficient when the calculated quality value of image data exceeds a specified threshold. Additionally or alternatively, the computer 110 may be programmed to determine the quality of the image 310, 320 based on other optical properties of the image 310, 320, e.g., contrast, saturation effect, etc., and/or based on a combination of various properties of the image 310, 320. Additionally or alternatively, the computer 110 may be programmed to determine the specified quality threshold based on the environmental conditions, e.g., 100 for day time, 80 for night time, etc.

In one example, the street light 170 may be configured to emit light beams in the first and second wavelength ranges, i.e., visible and infrared ranges, at night or when a level of ambient light falls below a specified threshold, e.g., based on data received from a light sensor mounted to the street light 170 and/or a central control circuit. For example, the computer 190 may be programmed to determine that the light intensity is below a specified threshold, e.g., 40 lux, which is approximately an intensity of ambient light during an overcast, sunrise, and/or sunset. Additionally or alternatively, the street light 170 may be configured to actuate, e.g., turn on or off the light source 180, and/or reduce an intensity of the emitted light from the light source 180, based on a location of the object 160, vehicle 100, etc. For example, an infrastructure computer 190 may be programmed to turn on the light source 180 or actuate the light source 180 to output the second wavelength based on a distance $d_2$ (see FIG. 1) of the object 160 to the street light 170. The infrastructure computer 190 may be communicatively connected to the street light 170, e.g., via a wired or wireless communication network. For example, the remote computer 110 may be programmed to actuate the street light 170 upon determining, based on location data received from an object 160 location sensor, that the object 160 is within a specified distance $d_3$, e.g., 200 meters, from the street light 170. For example, the computer 190 may be programmed to determine the distance $d_2$ based on stored location data of the street light 170 and received location data of the object 160, e.g., via a vehicle-to-infrastructure wireless communication network. The infrastructure computer 190 may be programmed to actuate the light source 180 based on motion data received from a second street light 170 and a location of the second street light 170.

Processing

Figure 5:
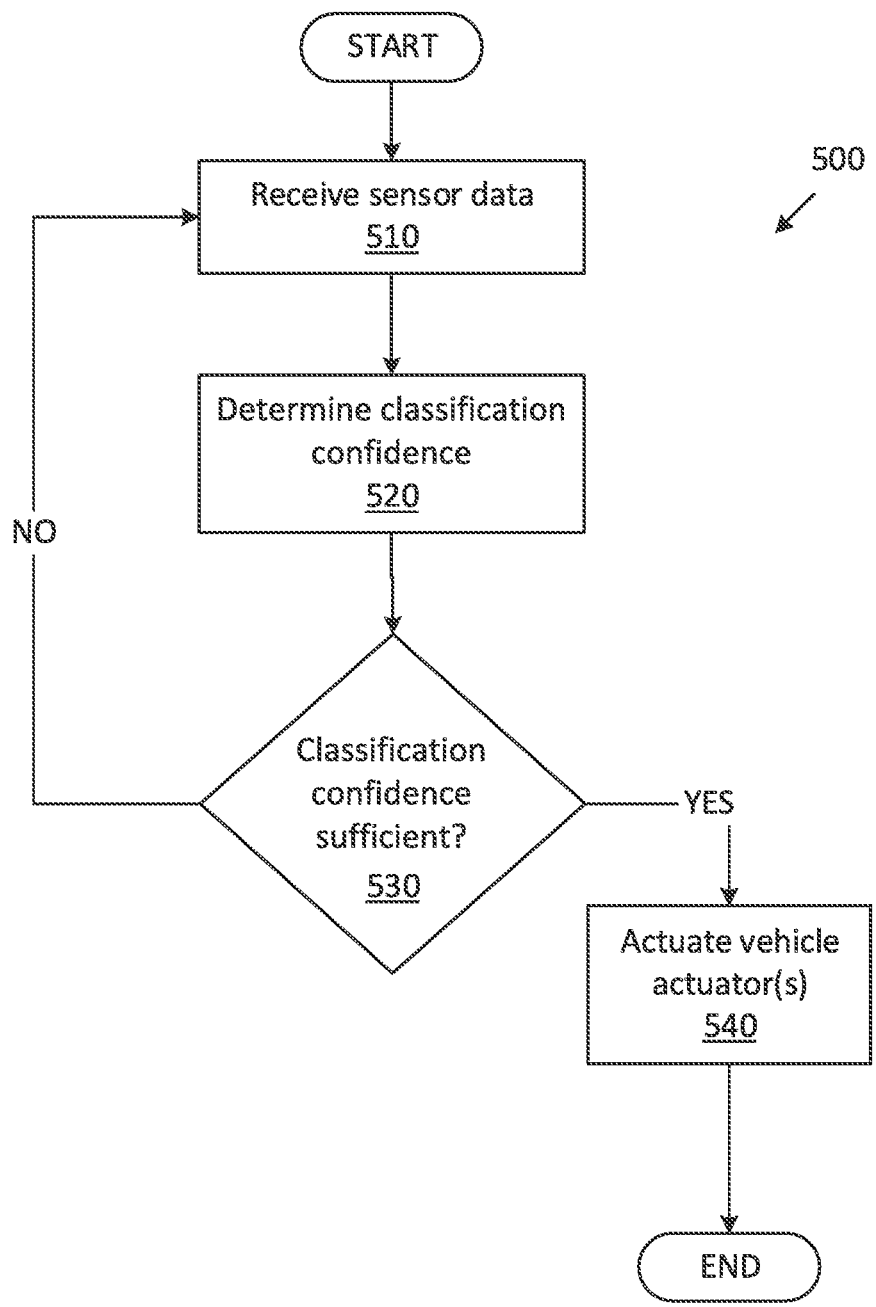
FIG. 5 is a flowchart of an exemplary process for operating the vehicle.

FIG. 5 is a flowchart of an exemplary process 500 for operating the vehicle 100. The computer 110 may be programmed to execute blocks of the process 500.

The process 500 begins in a block 510, in which the computer 110 receives data from the vehicle 100 sensor(s) 130, e.g., image data from the camera sensor(s) 130. The computer 110 may be programmed to receive image data including infrared image data, e.g., from an infrared camera sensor 130 and/or a camera sensor 130 that is configured to receive data from a camera 130 detecting visible light and a camera 130 detecting infrared light.

Next, in a block 520, the computer 110 determines a classification confidence of the received image data. The computer 110 may be programmed to determine the classification confidence for the received image data using, e.g., conventional object detection techniques. Additionally or alternatively, the computer 110 may be programmed to determine a quality value for the received image data by applying a specified quality definition, e.g., a formula and/or threshold for a quality determination, stored in the computer 110 memory, to the received image data. Additionally or alternatively, the computer 110 may be programmed to specify a quality definition based on an environmental condition, e.g., day time, night time, etc. The computer 110 may be programmed to determine a quality value, e.g., a mean value of the image histogram graph 410, 420, based on the received image data.

Next, in a decision block 530, the computer 110 determines whether the classification confidence and/or the quality of the received image data exceeds a specified threshold. If the computer 110 determines that the determined confidence exceeds a confidence threshold, e.g., 50%, and/or the quality, e.g., a brightness, of the received image data exceeds a predetermined threshold, e.g., 50 (in scale of 0 to 255 with reference to the graphs 410, 420), then the process 500 proceeds to a block 540; otherwise the process 500 returns to the block 510.

In the block 540, the computer 110 actuates a vehicle 100 actuator 120 to navigate the vehicle 100. The computer 110 may be programmed to navigate the vehicle 100 by actuating one or more of the vehicle 100 steering, braking, and/or propulsion actuator(s) 120 based on a predetermined destination, e.g., entered via the vehicle 100 HMI 140.

Following the process 500, the process 500 ends, or alternatively, returns to the block 510, although not shown in FIG. 5.

Figure 6:
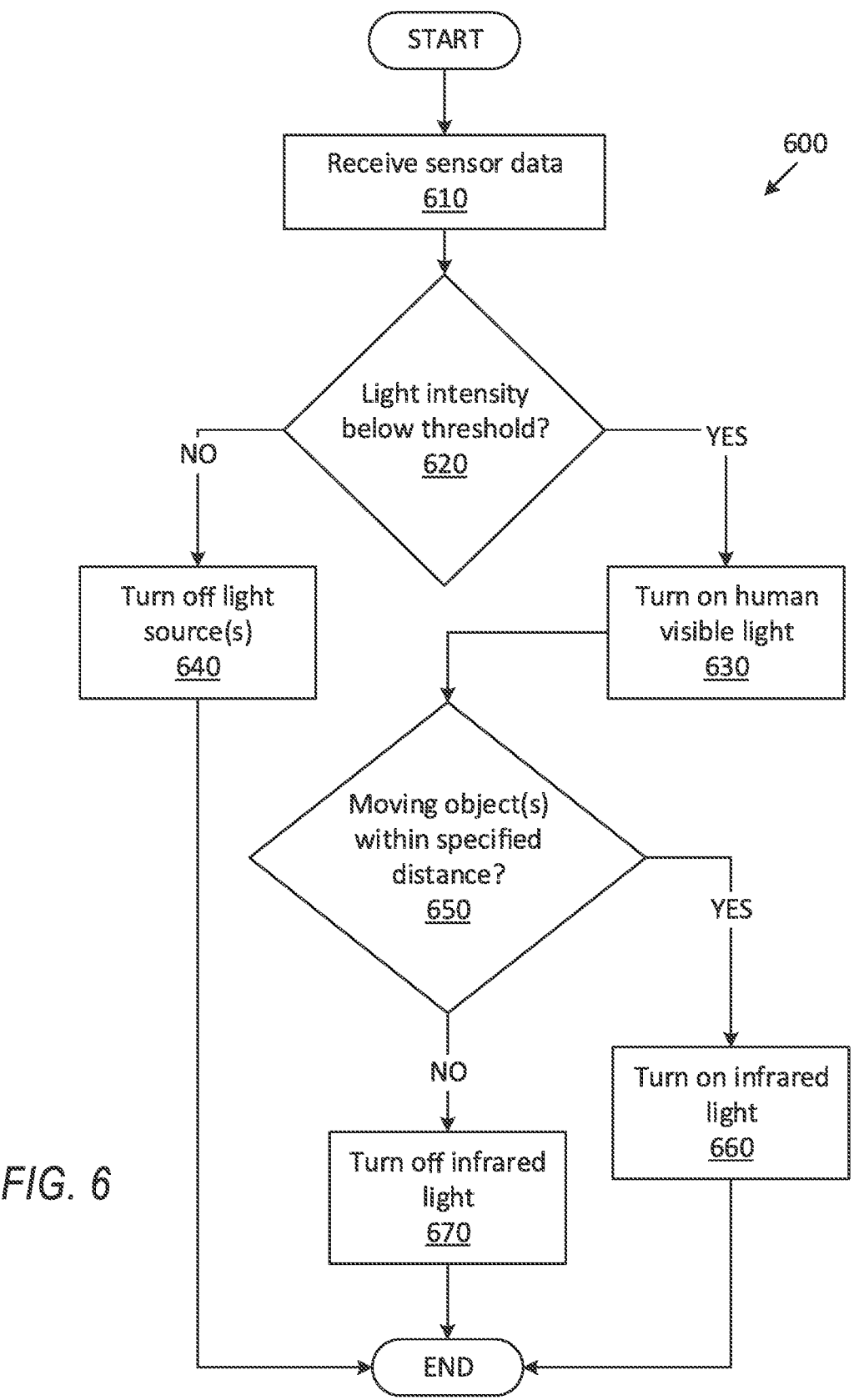
FIG. 6 is a flowchart of an exemplary process for operating the street light.

FIG. 6 is a flowchart of an exemplary process 600 for operating a street light 170. The infrastructure computer 190 may be programmed to execute blocks of the process 600.

The process 600 begins in a block 610, in which the infrastructure computer 190 receives data from sensors, e.g., light sensor, motion sensor, etc. mounted to the street light 170.

Next, in a decision block 620, the computer 190 determines whether the light intensity is below a specified threshold, e.g., 40 lux. The computer 190 may be programmed to determine the light intensity is below threshold, e.g., during night time, based on data received from a light sensor mounted to the street light 170. If the computer 190 determines that the light intensity is below a specified threshold, then the process 600 proceeds to a block 630; otherwise the process 600 proceeds to a block 640.

In the block 630, the computer 190 activates the light source 180 to emit light with a human visible wavelength. The computer 190 may be programmed to actuate the light source 180 to turn on, e.g., one or more LEDs with a human visible wavelength. Following the block 630, the process 600 proceeds to a decision block 650. Alternatively, in the block 630, the computer 190 may be programmed to turn on the infrared light source 180 of the street light 170. For example, the computer 190 may be programmed to actuate one or more infrared LEDs of the street light 170. In such an example, following the block 630, the process 600 ends, or alternatively returns to the block 610, although not shown in FIG. 6.

In the block 640, the computer 190 turns off the light source 180. In another example, the computer 190 may be programmed to dim down the light source 180 (i.e., reduce an amount of emitted light). Following the block 640, the process 600 ends.

In the decision block 650, the computer 190 determines whether at least a moving object 160 (e.g., a vehicle) is within a specified distance $d_3$, e.g., 200 meters, of the street light 170. The computer 190 may be programmed to determine that a moving object 160 is within the specified distance $d_3$ of the street light 170 (i.e., a distance $d_2$ of the object 160 to the street light 170 is less than the threshold distance $d_3$) based on, e.g., motion sensor data received from the street light 170, location coordinates of the object 160 received from a location sensor of the object 160, etc. Additionally or alternatively, the computer 190 may be programmed to determine that a moving object 160 is within the specified distance $d_3$ of the street light 170 based on data received from a second street light 170 motion sensor and a stored data including the distance between the street light 170 and the second street light 170. If the computer 190 determines that the moving object 160 is within a distance threshold $d_3$ of the street light 170, then the process 600 proceeds to a block 660; otherwise the process 600 proceeds to a block 670.

In the block 660, the computer 190 turns on the infrared light source 180 of the street light 170. For example, the computer 190 may be programmed to actuate one or more infrared LEDs of the street light 170.

In the block 670, the computer 190 turns of the infrared light source 180 of the street light 170. For example, the computer 190 actuates the light sources 180 to turns off the infrared LEDs of the light source 180 or to reduce an intensity of the emitted light from the infrared light source 180.

Following either of the block 660, 670, the process 600 ends, or alternatively returns to the block 610, although not shown in FIG. 6.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising;
a light source configured to emit light in a wavelength in a visible range and a wavelength in an infrared range; and
a vehicle, including:
an infrared camera, and
a computer programmed to:
receive image data from captured light including the visible wavelength and the infrared wavelength;
determine a classification confidence value of the received image data including the visible wavelength and the infrared wavelength, wherein the confidence value quantifies a suitability of the received image data for classifying the object; and
upon determining that the determined classification confidence value exceeds a specified threshold, identify an object based at least in part on an infrared image from the camera.

2. The system of claim 1, wherein the camera of the vehicle further includes an optical path configured to allow the infrared wavelength to pass.

3. The system of claim 1, wherein the computer is further programmed to actuate at least one of a vehicle propulsion, a vehicle steering, and a vehicle brake actuator, based on the identified object.

4. The system of claim 1, wherein the computer is further programmed to:
receive image data from captured light at each of the visible and infrared wavelengths;
determine a quality value of the received image data; and
upon determining that the determined quality value exceeds a specified threshold, identify the object.

5. The system of claim 1, further comprising a second computer, programmed to actuate the light source of a street light to emit light at the infrared wavelength upon, based on a location coordinate provided by the object, detecting the object and determining that the object is within a specified distance from the street light.

6. The system of claim 5, wherein the second computer is further programmed to determine that the object is within the specified distance from the street light based on stored location data of the street light and received object location data.

7. The system of claim 1, further comprising a second computer, programmed to actuate a light source of the street light, upon determining that an ambient light intensity is below a specified threshold.

8. The system of claim 7, wherein the second computer is further programmed to activate the light source to emit light with the visible wavelength, upon determining that an ambient light intensity is below a specified threshold.

9. The system of claim 1, wherein the light source is included in a street light.

10. A method, comprising;
emitting, from a light source, light in a wavelength in a visible range and a wavelength in an infrared range;
receiving image data from captured light including the visible wavelength and the infrared wavelength;
determining a classification confidence value of the received image data including the visible wavelength and the infrared wavelength, wherein the confidence value quantifies a suitability of the received image data for classifying the object; and
upon determining that the determined classification confidence value exceeds a specified threshold, identifying, in a vehicle, an object based at least in part on an infrared image from a vehicle infrared camera.

11. The method of claim 10, wherein the camera of the vehicle further includes an optical path configured to allow the infrared wavelength to pass.

12. The method of claim 10, further comprising actuating at least one of a vehicle propulsion, a vehicle steering, and a vehicle brake actuator, based on the identified object.

13. The method of claim 10, further comprising:
receiving image data from captured light at each of the visible and infrared wavelengths;
determining a quality value of the received image data; and
upon determining that the determined quality value exceeds a specified threshold, identifying the object.

14. The method of claim 10, further comprising actuating the light source of a street light to emit light at the infrared wavelength upon, based on a location coordinate provided by the object, detecting the object and determining that the object is within a specified distance from the street light.

15. The method of claim 14, further comprising determining that the object is within the specified distance from the street light based on stored location data of the street light and received object location data.

16. The method of claim 10, further comprising actuating the light source of a street light, upon determining that an ambient light intensity is below a specified threshold.

17. The method of claim 16, further comprising activating the light source to emit light with the visible wavelength, upon determining that an ambient light intensity is below a specified threshold.

18. The method of claim 10, wherein the light source is included in a street light.

19. A system, comprising;
a light source configured to emit light in a wavelength in a visible range and a wavelength in an infrared range; and
a vehicle including an infrared camera and a first computer programmed to identify an object based at least in part on an infrared image from the camera; and
a second computer programmed to actuate the light source of a street light to emit light at the infrared wavelength upon, based on a location coordinate provided by the object, detecting the object and determining that the object is within a specified distance from the street light.

* * * * *